No. 717,521. PATENTED JAN. 6, 1903.
P. A. ANDERSON.
AUTOMATIC REGULATOR FOR WINDMILLS.
APPLICATION FILED OCT. 13, 1902.
NO MODEL.
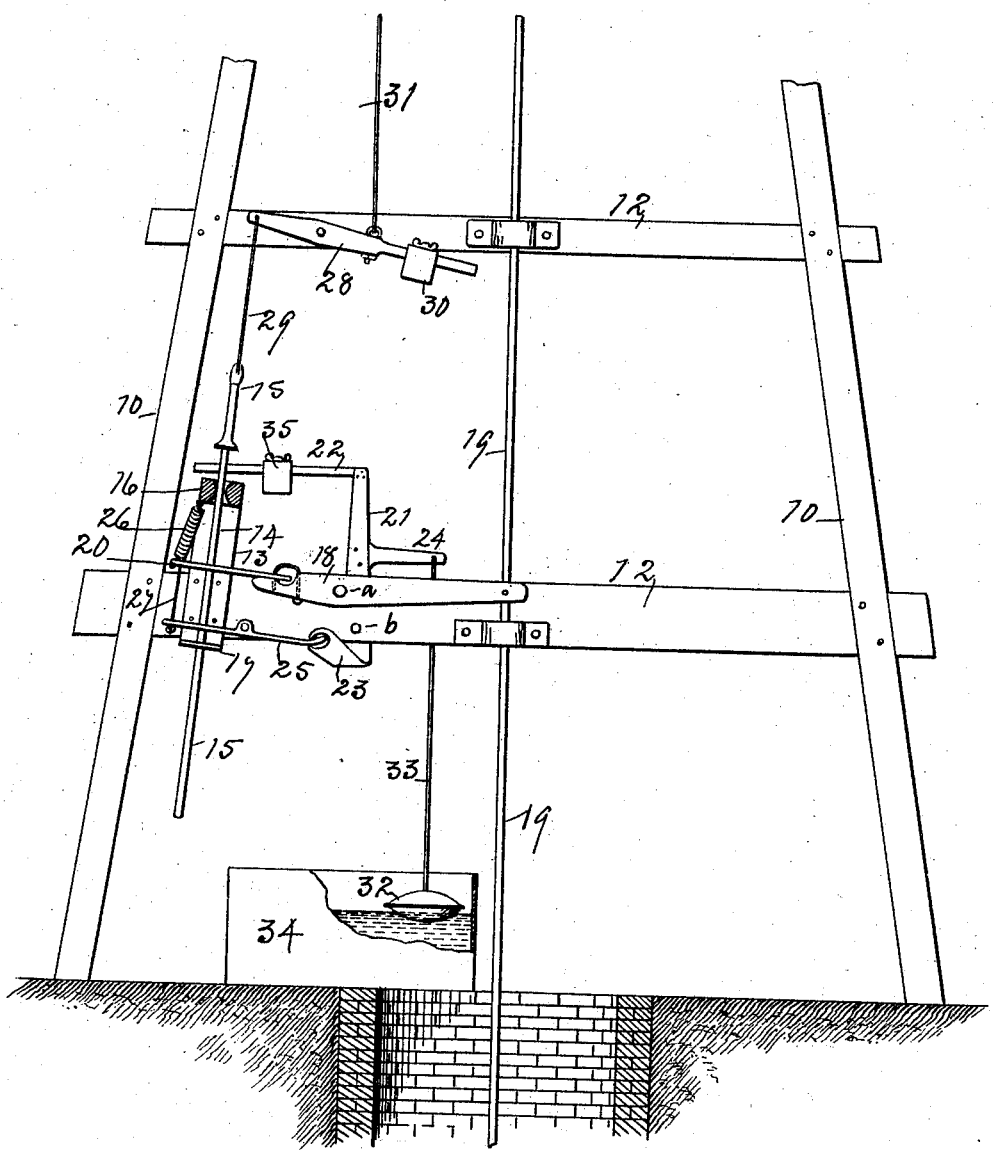

UNITED STATES PATENT OFFICE.

PETER A. ANDERSON, OF STANHOPE, IOWA.

AUTOMATIC REGULATOR FOR WINDMILLS.

SPECIFICATION forming part of Letters Patent No. 717,521, dated January 6, 1903.

Application filed October 13, 1902. Serial No. 127,201. (No model.)

*To all whom it may concern:*

Be it known that I, PETER A. ANDERSON, a citizen of the United States, residing at Stanhope, in the county of Hamilton and State of Iowa, have invented a new and useful Automatic Regulator for Windmills, of which the following is a specification.

My object is to provide simple, strong, and durable automatic mechanism for regulating a windmill, as required to prevent the overflow and waste of water pumped into a trough for watering stock in a field, &c.

My invention consists in the construction, arrangement, and combination of parts, as hereinafter set forth, pointed out in my claims, and illustrated in the accompanying drawing, in which—

The numeral 10 designates the uprights, and 12 the cross-pieces, of the frame of a derrick for supporting a wind-wheel and also my automatic regulating mechanism. A metal bearer 13 for supporting an adjustable weight 14 in the form of a round bar that has a head 15 is fixed to the lower cross-piece 12 in an upright position. A forward projection 16 at the top and a forward projection 17 at the lower end of the part 13 are provided with coinciding apertures for the passage of the bar 14. A lever 18 is fulcrumed to the cross-piece 12 by a pivot *a*, and pivotally connected with a reciprocating pump-rod 19 and 20 is a clamp pivotally connected with the short arm of the lever in such a manner that when the clamp is in its normal position the lever and pump-rod will have free motion. A frame consisting of an upright portion or lever 21, an arm 22 at its top, an elbow-shaped arm 23 at its bottom, and an arm 24 at its upper end portion is pivoted to the cross-piece 12 by a pivot *b*. A second clamp 25 is pivotally connected with the end of the elbow-shaped arm 23. The clamps 20 and 25 have coinciding apertures through which the round bar 14 is extended downward in such a manner that when the clamps are in their normal positions the rod will have free up-and-down motion.

A coil-spring 26 is fixed to the frame 13 at its upper end portion and to the end of the clamp 20, and a link 27 is pivotally connected with the clamp 20 and slidably connected with the clamp 25 in such a manner that both the clamps will be normally retained in position as required to allow the rod 14 free up-and-down motion through their coinciding apertures.

A lever 28 is pivoted to the upper cross-piece 12 of the derrick-frame and its short arm connected with the top of the bar 14 by a rod 29 and a weight 30 adjustably connected with the long arm of said lever to serve as a counterpoise for the bar 14, and a rod 31 is connected with the long arm of the lever 28 to be connected with a weighted lever combined with a wind-wheel at the top of the derrick in such a manner that when the reciprocating motion of the bar 14 is arrested the wind-wheel will be thrown out of gear with the pumping mechanism.

To arrest the motion of the reciprocating bar 14 and the pumping of water, a float 32 is suspended from the arm 24 of the pivoted frame to enter a water-trough 34, and a weight 35 adjustably connected with the arm 22 to balance the float in such a manner that when the water in the trough rises high enough it will lift the float, so that the weight 35 will vibrate the pivoted frame and throw the clamps 20 and 25 in position as required to bind the bar 14 and stop its reciprocating motion, to thereby throw the wind-wheel out of gear with the pumping mechanism, so that the elevating of water from a well into the trough will cease until the water in the trough is lowered so the float can descend again and actuate the pivoted frame and clamps, with which it is connected, as required to allow the clamps to resume their normal positions and to release the bar 14 as required for throwing the wind-wheel in gear again and starting the pump to replenish the trough with water.

Having thus described the purpose of my invention and the construction, arrangement, and combination of all the parts, its practical operation and utility will be understood by persons familiar with the art to which it pertains, and

What I claim as new, and desire to secure by Letters Patent, is—

1. A fixed metal bearer consisting of an upright having right-angled forward projections and coinciding apertures in said projections, a bar fitted in said apertures, a lever pivotally connected with a pump-rod, a clamp pivotally connected with the lever, a frame consisting of an upright having an elbow-shaped arm at its lower end, a clamp pivotally connected with the end of the elbow-shaped arm, coinciding apertures in the two clamps, a coil-spring fixed to the end of the upper clamp and to the upper forward extension of the fixed bearer and a rod pivotally connected with the upper clamp and slidably connected with the lower clamp and means for vibrating the pivoted frame having the elbow-shaped arm at its lower end, arranged and combined to operate in the manner set forth for the purposes stated.

2. An automatic regulator for windmills comprising a fixed bearer 13 having projections 16 and 17 provided with coinciding apertures, a bar 14 having a head 15, a lever 18 connected with a pump-rod 19, a clamp 20 pivoted to the end of said lever, a pivoted frame consisting of an upright 21, an arm 22 at its upper end, a weight on said arm, an elbow-shaped arm 23 at its lower end, an arm 24 at its central portion and a float suspended from said arm, a clamp 25 connected with the arm 23, coinciding apertures in the two clamps, a coil-spring 26 fixed to the projection 16 of the bearer 13, a link connected with the ends of the two clamps, a lever 28 connected with the bar 14 by a rod 29, a weight 30 on said lever and a rod 31 adapted to be arranged and combined with a derrick and a windmill in the manner set forth for the purposes stated.

PETER A. ANDERSON.

Witnesses:
J. E. SOGARD,
EMMA JOHNSON.